(12) United States Patent  (10) Patent No.: US 9,167,022 B2
Silbey et al.  (45) Date of Patent: Oct. 20, 2015

(54) WEBSITE COMPATABILITY SHIMS

(71) Applicant: Microsoft Corporation, Redmond, WA (US)

(72) Inventors: Marc A. Silbey, Mercer Island, WA (US); Carl A. Edlund, Kirkland, WA (US); Jim A. Moore, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/180,695

(22) Filed: Feb. 14, 2014

(65) Prior Publication Data

US 2014/0164496 A1  Jun. 12, 2014

Related U.S. Application Data

(63) Continuation of application No. 12/897,947, filed on Oct. 5, 2010, now Pat. No. 8,655,944.

(51) Int. Cl.
  G06F 15/16 (2006.01)
  H04L 29/08 (2006.01)
  G06F 9/445 (2006.01)

(52) U.S. Cl.
  CPC . H04L 67/02 (2013.01); G06F 8/65 (2013.01)

(58) Field of Classification Search
  USPC .................................. 709/203, 220, 223, 224
  See application file for complete search history.

(56) References Cited

U.S. PATENT DOCUMENTS

| 8,655,944 B2 | 2/2014 | Silbey et al. |
| 2003/0088716 A1 | 5/2003 | Sanders |
| 2003/0126311 A1 | 7/2003 | Kushnirskiy et al. |
| 2004/0027387 A1 | 2/2004 | Nason et al. |
| 2004/0031030 A1 | 2/2004 | Kidder et al. |
| 2008/0077855 A1 | 3/2008 | Lev et al. |
| 2008/0077941 A1 | 3/2008 | Holmes et al. |
| 2008/0104233 A1 | 5/2008 | Smith et al. |
| 2008/0215796 A1 | 9/2008 | Lam et al. |
| 2012/0084345 A1 | 4/2012 | Silbey et al. |

OTHER PUBLICATIONS

"Final Office Action", U.S. Appl. No. 12/897,947, Dec. 19, 2012, 8 pages.
"Non-Final Office Action", U.S. Appl. No. 12/897,947, Jun. 7, 2012, 7 pages.
"Notice of Allowance", U.S. Appl. No. 12/897,947, Oct. 8, 2013, 8 pages.
"Restriction Requirement", U.S. Appl. No. 12/897,947, May 11, 2012, 7 pages.
Bruckner,"MozPETs—a Privacy enhanced Web Browser", In Proceedings of Third Annual Conference on Privacy, Security and Trust, Available at <http://citeseerx.ist.psu.edu/viewdoc/download?doi=10.1.1.88.4716&rep=rep1&type=pdf>, 2005, 4 pages.
Wang,"The Multi-Principal OS Construction of the Gazelle Web Browser", Microsoft Tech Report, Available at <https://www.usenix.org/events/sec09/tech/full_papers/wang.pdf>, Feb. 19, 2009, 16 pages.

*Primary Examiner* — Lan-Dai T Truong
(74) *Attorney, Agent, or Firm* — John Jardine; Kate Drakos; Micky Minhas

(57) ABSTRACT

Various embodiments provide compatibility shims that can be utilized by a web browser to dynamically change web browser platform features per domain or website. The compatibility shims can be deployed to the web browser and updated in a manner similar to that of a webpage. In one or more embodiments, the compatibility shims can be utilized to change a browser's behavior and/or the manner in which the browser represents itself per domain or website. Further, the compatibility shims can enable the web browser to dynamically remove or change support for web platform features. In addition, in at least some embodiments, users can apply their own compatibility shims to their own list of websites or webpages.

20 Claims, 4 Drawing Sheets

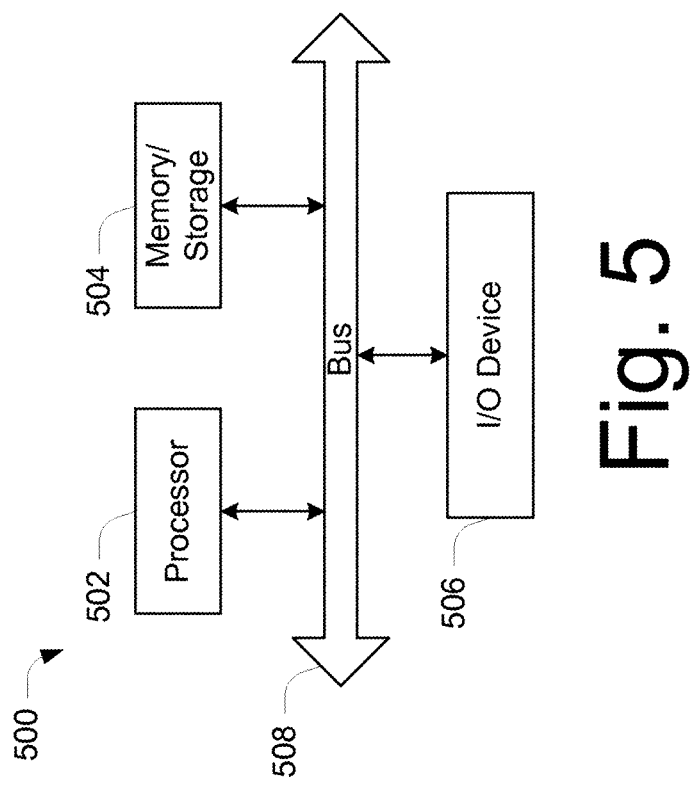

WEBSITE COMPATABILITY SHIMS

RELATED APPLICATIONS

The application claims priority under 35 U.S.C. Section 120 as a continuation of U.S. patent application Ser. No. 12/897,947, filed Oct. 5, 2010, and titled "Website Compatability Shims," the entire disclosures of which are incorporated by reference.

BACKGROUND

As web platforms, such as browsers, continue to evolve technically, challenges continue to be posed to web browser developers to develop web browsers that remain compatible and render a website's content in a manner that enhances, and does not detract from the user experience. For example, a web browser may have a particular or specific API that has been authored for it. A website may be specifically authored to use that particular API. If a new version of the web browser is released that has a modified API, the website may not be able to operate properly with the new API.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide compatibility shims that can be utilized by a web browser to dynamically change web browser platform features per domain or website. The compatibility shims can be deployed to the web browser and updated in a manner similar to that of a webpage.

In one or more embodiments, the compatibility shims can be utilized to change a browser's behavior and/or the manner in which the browser represents itself per domain or website. Further, the compatibility shims can enable the web browser to dynamically remove or change support for web platform features. In addition, in at least some embodiments, users can apply their own compatibility shims to their own list of websites or webpages.

BRIEF DESCRIPTION OF THE DRAWINGS

The same numbers are used throughout the drawings to reference like features.

FIG. 5 illustrates an example system that can be used to implement one or more embodiments.

DETAILED DESCRIPTION

Overview

Various embodiments provide compatibility shims that can be utilized by a web browser to dynamically change web browser platform features per domain or website. The compatibility shims can be deployed to the web browser and updated in a manner similar to that of a webpage. Further, in at least some embodiments, the compatibility shims can be utilized in a manner that is seamless to the end-user. Specifically, in these embodiments, no end user action is utilized to enable the compatibility shims to be deployed and utilized.

In one or more embodiments, the compatibility shims can be utilized to change a browser's behavior and/or the manner in which the browser represents itself per domain or website. Further, the compatibility shims can enable the web browser to dynamically remove or change support for web platform features. In addition, in at least some embodiments, users can apply their own compatibility shims to their own list of websites or webpages.

In the discussion that follows, a section entitled "Operating Environment" is provided and describes one environment in which one or more embodiments can be employed. Following this, a section entitled "Changing a Browser's Behavior or Representation of Itself" describes embodiments in which a web browser can change its behavior or representation of itself. Last, a section entitled "Example System" describes an example system in accordance with one or more embodiments.

Operating Environment

Figure 1:
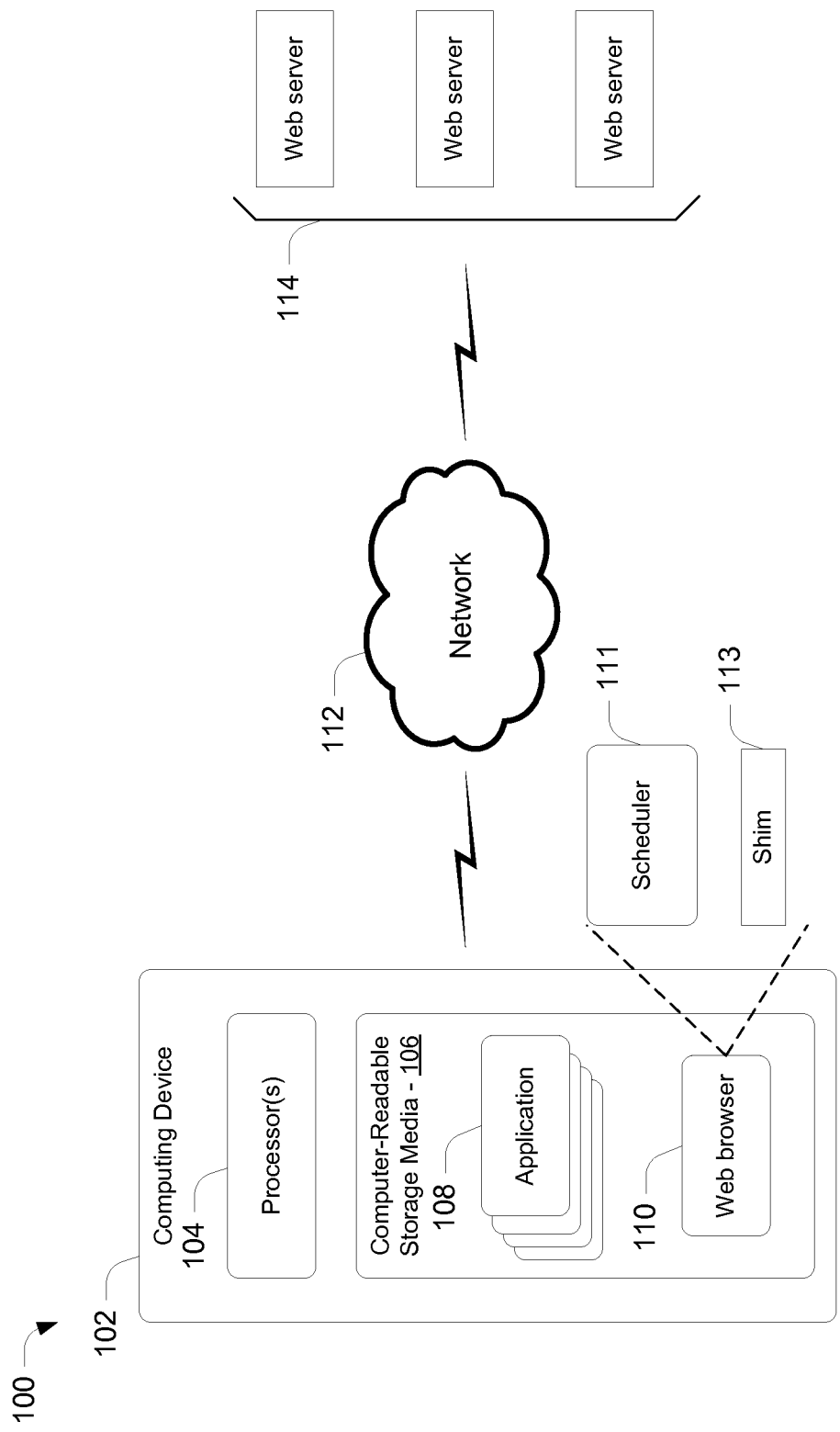
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 5.

In addition, computing device 102 includes a software application in the form of a web browser 110 that includes or otherwise makes use of a scheduler module 111 and one or more compatibility shims 113. The scheduler module 111 is configured to oversee acquisition of compatibility shims in accordance with a schedule. The compatibility shims can be utilized by a web browser to dynamically change web browser platform features per domain or website, as described above and below. The compatibility shims can be deployed to the web browser and updated in a manner similar to that of a webpage. Further, in at least some embodiments, the compatibility shims can be utilized in a manner that is seamless to the end-user. Specifically, in these embodiments, no end user action is utilized to enable the compatibility shims to be selected, deployed and utilized. That is, in one or more embodiments, the compatibility shims can be used by the browser to initiate download of shim updates without the user having to select to download a new compatibility shim.

In one or more embodiments, the compatibility shims can be utilized to change a browser's behavior and/or the manner in which the browser represents itself per domain or website. Further, the compatibility shims can enable the web browser to dynamically remove or change support for web platform features. In addition, in at least some embodiments, users can apply their own compatibility shims to their own list of websites or webpages.

In addition, environment 100 includes a network 112, such as the Internet, and one or more web servers 114 from and to which content can be received and sent, as described above and below. Such content can include web pages that are received from the web servers.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of some example embodiments that can utilize compatibility shims.

Changing a Browser's Behavior or Representation of Itself

In one or more embodiments, shims can be used to change a web browser's behavior and/or the manner in which a web browser represents itself. This can be done in a number of ways. For example, compatibility shims can override a web browser's versioning logic such as, by way of example and not limitation, by overriding specific features or behaviors associated with particular versions of a web browser. Any suitable specific features and/or behaviors can be overridden using compatibility shims. In the discussion that follows, example features and/or behaviors are described to provide the reader with context of specific features and/or behaviors that can be changed in accordance with one or more embodiments. It is to be appreciated and understood, however, that the following discussion serves as but a few examples of how the inventive techniques can be employed. Accordingly, the following discussion should not be used to limit application of the claimed subject matter to the specific examples given.

Following the discussion of the specific features and/or behaviors, a discussion of how compatibility shims can be used to modify or change specific features and/or behaviors is provided.

In at least some embodiments, specific features and/or behaviors are associated with a so-called Document Mode, User Agent String and/or Conditional Comment Settings, to name just a few.

Document Mode

Document compatibility defines how web browsers, such as Microsoft's Internet Explorer, render web pages. To facilitate a consistent appearance in future versions of web browsers, the notion of document compatibility can be used. Document compatibility enables specific rendering modes or "document modes" to be utilized to display webpages in the web browser.

Consider that for each major release of a web browser, such as Internet Explorer, new features are added to attempt to make the browser easier to use, to increase security, and to more closely support industry standards. As a web browser gains features, there is an attendant risk that older websites may not display correctly. To reduce this risk, web developers can choose the particular way in which the browser interprets their webpages. That is, the web developers can specify a particular document mode that is to be used for rendering their webpages. For example, if a newer version of a web browser cannot display a website's content properly, the web developer can specify, via the document mode, an older version of the web browser that can properly display the website's content. Thus, when the web browser receives content from the website, it can ascertain the developer-specified document mode and, accordingly, render the website's content using the specified document mode. This can enable the developer to have their content displayed while, at the same time, provide time for the web developer to update their site to support the new web browser.

However, there are instances when either a document mode has not been specified for a website's content because one may have been assumed by the developer, or the document mode that is specified will not be able to be used to properly render the webpage for some reason. In these and other instances, the inventive embodiments can allow for shims to be used to modify the behavior of the web browser independent of developer or user action, so that a webpage can be rendered, as will become apparent below.

As an example of specific document compatibility modes for Microsoft's Internet Explorer 8, consider the table just below. The specific modes and accompanying definitions constitute examples only and are used simply to represent that a number of document modes are available and can be specified by web developers.

| Document Mode | Definition |
| --- | --- |
| Emulate IE8 mode | Tells Internet Explorer to use the <!DOCTYPE> directive to determine how to render content. Standards mode directives are displayed in Internet Explorer 8 standards mode and quirks mode directives are displayed in IE5 mode. |
| Emulate IE7 mode | Tells Internet Explorer to use the <!DOCTYPE> directive to determine how to render content. Standards mode directives are displayed in Internet Explorer 7 standards mode and quirks mode directives are displayed in IE5 mode. Unlike IE7 mode, Emulate IE7 mode respects the <!DOCTYPE> directive. For many Web sites, this is the preferred compatibility mode. |
| IE5 mode | Renders content as if it were displayed by Internet Explorer 7's quirks mode, which is very similar to the way content was displayed in Internet Explorer 5. |
| IE7 mode | Renders content as if it were displayed by Internet Explorer 7's standards mode, whether or not the page contains a <!DOCTYPE> directive. |
| IE8 mode | Provides support for industry standards, including the W3C Cascading Style Sheets Level 2.1 Specification and the W3C Selectors API, and limited support for the W3C Cascading Style Sheets Level 3 Specification (Working Draft). |
| Edge mode | Tells Internet Explorer to display content in the highest mode available. With Internet Explorer 8, this is equivalent to IE8 mode. If a future release of Internet Explorer supported a higher compatibility mode, such as IE9, pages set to edge mode would appear in the highest mode supported by that version. Those same pages would still appear in IE8 mode when viewed with Internet Explorer 8. |

The section entitled "Using Compatibility Shims" below describes one or more embodiments in which compatibility shims can be utilized to modify or change document mode settings in accordance with one or more embodiments.

User Agent String

The user-agent string is used to identify a particular web browser that is being used and can provide certain system details to servers hosting websites that are visited. When a web page is requested by a web browser, the web browser sends a number of headers to the server hosting the site that is being visited. Each header contains details that help the server determine the best way to provide the information that is requested by the web browser. The user-agent header identifies the application requesting the information from the server. The user-agent string can contain optional details called tokens, which are enclosed in parentheses and vary among programs. Thus, the user agent string can include the application name and version. Optionally, tokens can include a compatibility token to indicate that the web browser is compatible with a common set of features, a version token to identify the browser and the version number, and a platform token to identify the system's operating system and contain the version number of the operating system.

The section entitled "Using Compatibility Shims" below describes one or more embodiments in which compatibility shims can be utilized to modify or change the user agent string in accordance with one or more embodiments.

Conditional Comment Settings

One of the most common operations performed in a web page is to detect the browser type and version. Browser detection is performed to ensure that the content presented to the browser is compatible and renders correctly. The browser type can be detected using many different techniques. Many methods of browser detection make use of script on the server or client. Conditional comments, on the other hand, offer alternatives over scripted browser detection techniques. Conditional comments can enable developers to take advantage of enhanced browser features that appear in current and later browser versions, while at the same time, enable developers to write pages that downgrade gracefully in less-capable browsers.

Conditional comments are conditional expressions that are formed from a combination of feature, operator, and/or value, depending on the feature. Conditional comments, as will be appreciated by the skilled artisan, can provide a desired mechanism to differentiate Cascading Style Sheets (CSS) rules intended for specific versions of a web browser such as Internet Explorer.

The section entitled "Using Compatibility Shims" below describes one or more embodiments in which compatibility shims can be utilized to modify or change behavior associated with conditional comments in accordance with one or more embodiments.

There are other classes of changes that can be utilized beyond those associated with document modes, user agent strings and conditional comments. For example, behaviors associated with APIs can be modified. Alternately or additionally, an API can be removed in its entirety. Examples of API-related behavior are provided below.

Using Compatibility Shims

Before discussing how a compatibility shim can be used to change a web browser's behavior in accordance with one or more embodiments, consider first an example compatibility shim.

Figure 2:
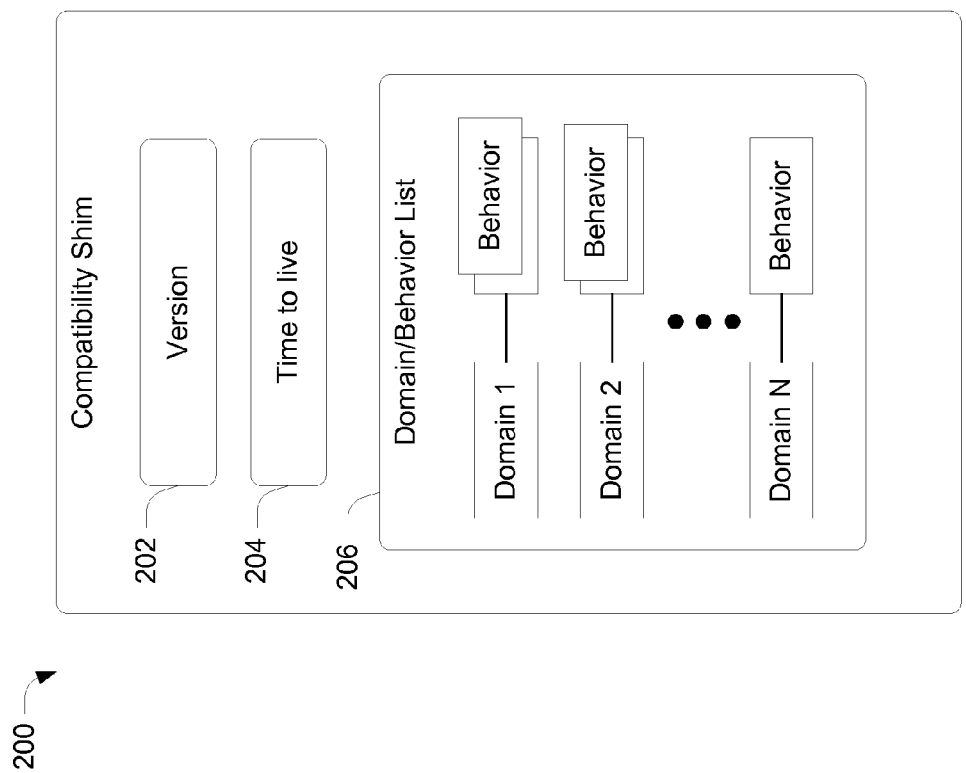
FIG. 2 illustrates an example compatibility shim in accordance with one or more embodiments.

FIG. 2 illustrates an example compatibility shim in accordance with one or more embodiments generally at 200. In this example, compatibility shim 200 includes a version 202, a time-to-live 204, and a domain/behavior list 206.

In the illustrated and described embodiment, the version 202 describes the particular version of the compatibility shim. The version is utilized, as will be described below, to provide updated compatibility shims to client devices.

In the illustrated and described embodiment, the time-to-live 204 is a configurable parameter or value that controls the frequency of updates to the compatibility shim. In at least one embodiment, based on the time-to-live and the last time a compatibility shim was downloaded, a semi-random distribution is calculated around the delta such that the closer one gets to the time-to-live value, the more likely it is that a download event will be triggered. When a download event is triggered, the web browser sends the version 202 to an update server and, if the version is older than the version maintained by the update server, an updated compatibility shim is downloaded to the client device. This constitutes a pull model in which a client can update their associated compatibility shim.

In the illustrated and described embodiment, domain/behavior list 206 defines an association between individual domains, as represented by "Domain 1," "Domain 2," and "Domain N" and associated behaviors. The associated behaviors define the manner in which the web browser behaves relative to and/or represents itself to an associated domain. In one or more embodiments, a domain can have one or more behaviors associated with it.

Any suitable behavior(s) can be associated with a particular domain examples of which include, by way of example and not limitation, behaviors associated with which document mode is selected for rendering a website's content, which user agent string is returned to a web server, how conditional comments are treated by the web browser, and the like.

With respect to which document mode is selected by the web browser for rendering content, consider the following. Assume that a particular website specifies a document mode that is designed to render content in the highest document mode supported by a web browser. In the above example, such document mode would constitute "Document Edge" mode. Assume also that the browser knows that this particular website's content cannot be rendered in the current web browser's highest document mode. In this case, domain/behavior list 206 can include, for the associated domain, a behavior that selects a document mode associated with a previous legacy setting to ensure that the content can be rendered. As another example, assume that a particular webpage was authored to assume a particular document mode, but did not specify one. In this case, if a browser is upgraded, it is possible that this content may not render properly in the new browser. However, a compatibility shim can be utilized to specify a particular legacy mode for this domain that results in the webpage being rendered in a previous document mode.

With respect to user agent strings, consider the following. Depending on a particular domain, the domain/behavior list 206 can specify whether to send an extended user agent string that includes the optional tokens mentioned above, or simply an abbreviated user agent string that does not include the optional tokens. Sending an abbreviated user agent string can conserve resources and processing overhead.

With respect to conditional comments, consider the following. A website may include a conditional comment that specifies a particular style sheet. It is possible, in some instances, that evaluating the conditional comment will result in no style sheets being applied. In this instance, the domain/behavior list 206 can specify that for this particular domain, the conditional comment should evaluate as if the web browser was a particular different version.

With respect to APIs and associated behavior, consider the following. Assume that a browser API call is modified in a new browser upgrade to change its treatment of an input string. Assume also that in the new browser upgrade, the API modification would treat a previously, syntactically-correct string as improper and return an error. In this instance, a shim can be utilized to enable the previously, syntactically-correct string to be processed in the new browser, but using the previous legacy syntax.

As another API-associated example, consider the following. Some browsers include proprietary APIs which can be used by a website to infer which browser their content is being used on. This has driven existing coding patterns to appreciate the proprietary APIs and provide a code path that is appropriate for the proprietary APIs, while at the same time provide an alternate code path that is appropriate for browsers that do not support the proprietary APIs and are more standards-compliant. Assume now that a new browser upgrade changes to become more standards-compliant in a manner that would cause selection of the code path associated with the proprietary API and accordingly, result in a failure. In this case, a compatibility shim can be utilized to disable this property such that the coding pattern will result in the new browser processing the alternate, standards-compliant code path.

An example excerpt of a compatibility shim is shown just below:

```
<?xml version="1.0" encoding="utf-8" ?>
- <ie9compatlistdescription
xmlns="http://www.microsoft.com/schemas/ie9compatlistdescription
/1.0">
    <version>1152921504606846989</version>
    <ttl>1</ttl>
    <domain>104.com.tw</domain>
    <domain docMode="EmulateIE8">10jqka.com.cn</domain>
    <domain>1111.com.tw</domain>
    <domain>118114.cn</domain>
    <domain docMode="EmulateIE8">123people.co.uk</domain>
    <domain docMode="EmulateIE8">15min.lt</domain>
```

In this excerpt, the time-to-live is indicated in the <ttl> tag. Also, a document mode modification is shown for the domain "10jqka.com.cn" as well as a couple others.

Having considered an example compatibility shim, consider now how compatibility shims can be utilized and processed by a client device.

Figure 3:
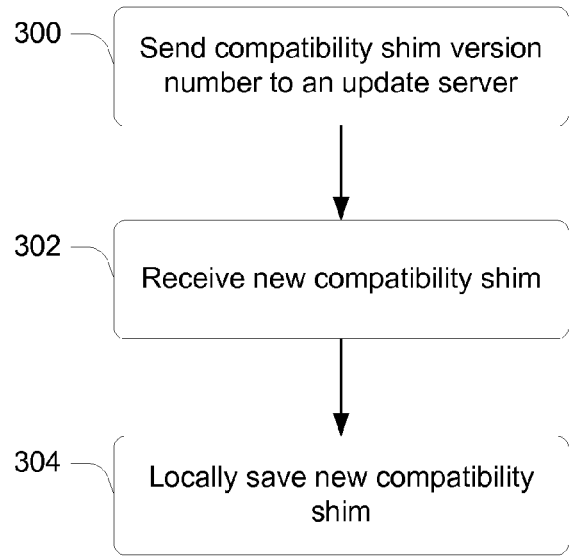
FIG. 3 is a flow diagram that describes steps in a method in accordance with one or more embodiments.

FIG. 3 is a flow diagram that describes steps a method for updating a compatibility shim in accordance with one or more embodiments. The method can be implemented in connection with any suitable hardware, software, firmware, or combination thereof. In at least some embodiments, the method can be implemented in software in the form of a web browser and/or a scheduler such as scheduler 111 in FIG. 1.

Step 300 sends a compatibility shim version number to an update server. This step can be performed in any suitable way. For example, a client device can send the compatibility shim version number to the update server in accordance with a predefined period. Alternately or additionally, and as described above, some compatibility shims can include a time-to-live that can be utilized by the client device to ascertain when to send a particular compatibility shim version number to the update server. Step 302 receives a new compatibility shim from the update server. Step 304 locally saves the new compatibility shim on the client device. In at least some embodiments, the received compatibility shim can be combined or merged with a user's compatibility settings. That is, in some embodiments, a user can provide their own list that associates domains with particular behaviors. In these instances, the received compatibility shim can be merged with the user's own list to define a unified compatibility shim. In instances where there is a conflict between the received compatibility shim and the user's own list, the user's settings can prevail.

Having received a new compatibility shim, the client device can now use the compatibility shim responsive to navigation activities associated with the web browser.

Figure 4:
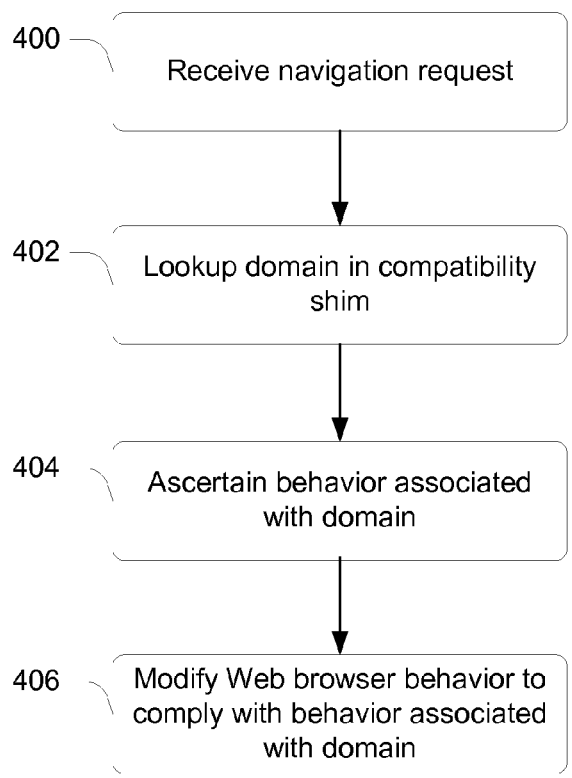
FIG. 4 is a flow diagram that describes steps in a method in accordance with one or more embodiments.

FIG. 4 is a flow diagram that describes steps a method for using a compatibility shim in accordance with one or more embodiments. The method can be implemented in connection with any suitable hardware, software, firmware, or combination thereof. In at least some embodiments, the method can be implemented in software in the form of a web browser.

Step 400 receives a navigation request. The step can be performed in any suitable way. For example, the step can be performed when a user clicks on a link on a web page. Responsive to receiving the navigation request, step 402 looks up an associated domain in the compatibility shim. Step 404 ascertains a behavior associated with the domain. Step 406 modifies the web browser behavior to comply with the behavior associated with the domain. Modification of the web browser behavior can take place in any suitable way examples of which are provided above.

Having described example methods in accordance with one or more embodiments, consider now an example system that can be utilized to implement one or more embodiments.

Example System

FIG. 5 illustrates an example computing device 500 that can be used to implement the various embodiments described above. Computing device 500 can be, for example, computing device 102 of FIG. 1.

Computing device 500 includes one or more processors or processing units 502, one or more memory and/or storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Component 504 can include volatile media (such as random access memory (RAM)) and/or nonvolatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide compatibility shims that can be utilized by a web browser to dynamically change web browser platform features per domain or website. The compatibility shims can be deployed to the web browser and updated in a manner similar to that of a webpage.

In one or more embodiments, the compatibility shims can be utilized to change a browser's behavior and/or the manner in which the browser represents itself per domain or website. Further, the compatibility shims can enable the web browser to dynamically remove or change support for web platform features. In addition, in at least some embodiments, users can apply their own compatibility shims to their own list of websites or webpages.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. One or more computer-readable storage media devices embodying computer-readable instructions which, when executed, implement a method comprising:
receiving a navigation request;
responsive to receiving the navigation request, looking up an associated domain in a compatibility shim that is configured to enable a web browser to modify its behavior on a per domain basis;
ascertaining a behavior associated with the domain; and
modifying a behavior associated with the web browser to comply with the behavior associated with the domain.

2. The one or more computer readable storage devices of claim 1, wherein the compatibility shim comprises a list of one or more domains and at least one behavior associated with each domain in the list.

3. The one or more computer readable storage devices of claim 1, wherein the associated behavior relates to a browser API call.

4. The one or more computer readable storage devices of claim 1, wherein the associated behavior causes a document to be rendered in other than the current version of the web browser.

5. The one or more computer readable storage devices of claim 1, wherein the compatibility shim includes a time-to-live that controls frequency of updates to the compatibility shim.

6. The one or more computer readable storage devices of claim 1, wherein the compatibility shim includes a version that is utilized to update the compatibility shim.

7. The one or more computer readable storage devices of claim 1, wherein the compatibility shim is configured to change a manner in which the web browser represents itself per domain.

8. A computer-implemented method comprising:
receiving a navigation request;
responsive to receiving the navigation request, looking up an associated domain in a compatibility shim that is configured to enable a web browser to modify its behavior on a per domain basis;
ascertaining a behavior associated with the domain; and
modifying a behavior associated with the web browser to comply with the behavior associated with the domain.

9. The computer-implemented method of claim 8, wherein the compatibility shim comprises a list of one or more domains and at least one behavior associated with each domain in the list.

10. The computer-implemented method of claim 8, wherein the associated behavior relates to a browser API call.

11. The computer-implemented method of claim 8, wherein the associated behavior causes a document to be rendered in other than the current version of the web browser.

12. The computer-implemented method of claim 8, wherein the compatibility shim includes a time-to-live that controls frequency of updates to the compatibility shim.

13. The computer-implemented method of claim 8, wherein the compatibility shim includes a version that is utilized to update the compatibility shim.

14. The computer-implemented method of claim 8, wherein the compatibility shim is configured to change a manner in which the web browser represents itself per domain.

15. A system comprising:
one or more processors;
memory coupled to the one or more processors, the memory comprising instructions executable by the one or more processors to:
receive a navigation request;
responsive to receiving the navigation request, look up an associated domain in a compatibility shim that is configured to enable a web browser to modify its behavior on a per domain basis;
ascertain a behavior associated with the domain; and
modify a behavior associated with the web browser to comply with the behavior associated with the domain.

16. The system of claim 15, wherein the compatibility shim comprises a list of one or more domains and at least one behavior associated with each domain in the list.

17. The system of claim 15, wherein the associated behavior relates to a browser API call.

18. The system of claim 15, wherein the associated behavior causes a document to be rendered in other than the current version of the web browser.

19. The system of claim 15, wherein the compatibility shim includes a time-to-live that controls frequency of updates to the compatibility shim.

20. The system of claim 15, wherein the compatibility shim includes a version that is utilized to update the compatibility shim.

* * * * *